(12) United States Patent
Barkan et al.

(10) Patent No.: US 7,514,702 B2
(45) Date of Patent: Apr. 7, 2009

(54) COMPACT SCAN ENGINE

(75) Inventors: Edward D. Barkan, Miller Place, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 87 days.

(21) Appl. No.: 11/700,846

(22) Filed: Jan. 31, 2007

(65) Prior Publication Data
US 2008/0179552 A1 Jul. 31, 2008

(51) Int. Cl.
*G06K 7/10* (2006.01)
(52) U.S. Cl. .................. 250/559.05; 250/559.06; 235/454; 235/462.11
(58) Field of Classification Search ........... 250/559.06, 250/236; 235/454, 462.11, 462.01, 459.1, 235/384
See application file for complete search history.

(56) References Cited

U.S. PATENT DOCUMENTS

| | | | | |
|---|---|---|---|---|
| 6,098,877 | A * | 8/2000 | Barkan et al. | 235/25 |
| 6,443,360 | B1 * | 9/2002 | Marchi et al. | 235/462.25 |
| 6,607,128 | B1 * | 8/2003 | Schwartz et al. | 235/454 |
| 7,111,787 | B2 * | 9/2006 | Ehrhart | 235/472.01 |
| 2003/0071123 | A1 * | 4/2003 | Tsikos et al. | 235/454 |
| 2003/0080188 | A1 | 5/2003 | Carlson et al. | |
| 2003/0168512 | A1 | 9/2003 | Longacre, Jr. et al. | |
| 2006/0118628 | A1 * | 6/2006 | He et al. | 235/454 |

FOREIGN PATENT DOCUMENTS

EP 1 679 637 A2 7/2006
EP 1 804 192 A1 7/2007

OTHER PUBLICATIONS

PCT International Search Report—4pgs., Jul. 11, 2008, Symbol Technologies, Inc.
PCT Written Opinion of the International Searching Authority, Jul. 11, 2008, Symbol Technologies, Inc.

* cited by examiner

*Primary Examiner*—Georgia Y Epps
*Assistant Examiner*—Tony Ko
(74) *Attorney, Agent, or Firm*—Tarolli, Sundheim, Covell & Tummino LLP

(57) ABSTRACT

A scan engine (15) includes illumination sources (48, 50) for projecting a light beam (40) upon a target object, a focusing lens (44) that receives a reflected light (34) of the target object and focuses a reflected image (35) as it passes through the focusing lens (44) along an optical axis (A-A), and a linear sensor (46) that receives the reflected image (35) from the focusing lens (44). The linear sensor (46) provides a signal (59) representing the reflected image (34). A circuit board (16) is integrally connected to the illumination sources (48, 50) and the linear sensor (46).

9 Claims, 4 Drawing Sheets

COMPACT SCAN ENGINE

FIELD OF THE INVENTION

The present invention relates generally to a field of imaging readers and scanners and more particularly to a compact, low cost scan engine used in imaging readers and scanners for identifying a target object.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Uniform Product Code (UPC), typically used in retail stores sales; Code 39, primarily used in inventory tracking; and Postnet, which is used for encoding zip codes for U.S. mail. Systems that read and decode bar codes employing 1-dimensional imagers, charged coupled device (CCD), or complementary metal oxide semiconductor (CMOS) based imaging systems are typically referred to hereinafter as imaging systems, imaging-based bar code readers or bar code scanners.

Imaging-based bar code reader systems electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Imaging-based barcode reader systems that include CCD, CMOS, or other imaging configurations comprise a plurality of photosensitive elements (photosensors) or pixels typically aligned in an array pattern that could include a number of arrays. The imaging-based bar code reader systems employ light emitting diodes (LEDs) or other light sources for illuminating a target object, e.g., a target bar code. Light reflected from the target bar code is focused through a lens of the imaging system onto the pixel array. As a result, the focusing lens generates an image from its field of view (FOV) that is projected onto the pixel array. Periodically, the pixels of the array are sequentially read out creating an analog signal representative of a captured image frame. The analog signal is amplified by a gain factor, by for example an operational amplifier. The amplified analog signal is digitized by an analog-to-digital converter. Decoding circuitry of the imaging system processes the digitized signals representative of the captured image frame and attempts to decode the imaged bar code. The decoding circuitry can be in the form of an application specific analog circuit (ASIC) or internal circuitry relating to a microprocessor.

Imaging scan engines for barcode reading and scanning have been available to OEMs for a number of years. The scan engines typically include a senor array and are a convenient for adding barcode reading capability to any product in need of such technology.

In existing linear imaging scan engines, the circuit board is typically positioned parallel to the axis of the optical system. Such configuration requires the presence of either a fold mirror in between the image sensor found in the scan engine and its focusing lens. Alternatively, the image sensor is remotely mounted from a main circuit board, requiring a flex circuit or a secondary circuit board for making a connection between the image sensor and main circuit board. Such constructions are expensive to manufacture and undesirably command a large amount of space.

SUMMARY

The present invention relates to a scan engine that includes illumination sources for projecting light beams upon a target object, a focusing lens that receives a reflected light from the target object and focuses a reflected image as it passes through the focusing lens along an optical axis, and a linear sensor that receives the reflected image from the focusing lens. The linear sensor provides a signal representing the reflected image. A circuit board is integrally connected to the illumination sources and the linear sensor.

The present invention also relates to a method of processing indicia with a scan engine that includes projecting a light beam upon a target object from illumination sources, focusing a reflected image of the target object through a focusing lens onto a linear sensor, generating a signal from the linear sensor corresponding to the reflective image, and transmitting the signal to an output. The method further includes forming a communication connection between the illumination sources, linear sensor and a printed circuit board by integrally mounting the illumination sources and linear sensor to the printed circuit board.

The present invention further relates to computer readable media comprising computer-executable instructions for performing method steps to process indicia with a scan engine, the instructions include the steps of projecting a light beam upon a target object from illumination sources, focusing a reflected image of the target object through a focusing lens onto a linear sensor, generating a signal from the linear sensor corresponding to the reflective image, and transmitting the signal to an output. The step further comprises forming a communication connection between the illumination sources, the linear sensor, and a printed circuit board by integrally mounting the illumination sources and linear sensor to the printed circuit board.

The present invention yet further relates to a scan engine comprising a means for illuminating a target object at which the scan engine is directed, a means for focusing a reflected image of the target object, a means for generating a signal relating to the reflected image, the means for generating a signal, receiving the reflected image. The scan engine further comprising a means for integrally connecting the illuminating means and the means for generating a signal to allow for communication therebetween.

The present invention also yet further relates to a scan engine for decoding indicia descriptive of an article having a linear sensor that receives a reflected image relating to the indicia, the scan engine includes a housing providing a container for the scan engine, the housing having a plurality of surfaces. The scan engine further includes a plurality of illumination sources located within the housing for projecting light beams upon the indicia, and a plurality of illumination lenses moveably connected to the housing and corresponding to the plurality of illumination sources. The illumination lenses have a horizontal slit aperture allowing each of the illumination sources to project a light beam through a corresponding illumination lens such that the illumination lenses form a narrow line of light from each respective light beam. The scan engine also includes an imaging lens for focusing a reflected image of the target object onto the linear sensor about an optical axis, and a circuit board integrally connected to the plurality of illuminations sources and linear sensor, allowing for communication therebetween. The circuit board is transversely mounted relative to the optical axis and fixedly attached to the housing.

These and other objects, advantages, and features of the exemplary embodiments are described in detail in conjunction with the accompanying drawings.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE DRAWINGS AND PREFERRED EMBODIMENTS

Figure 1:
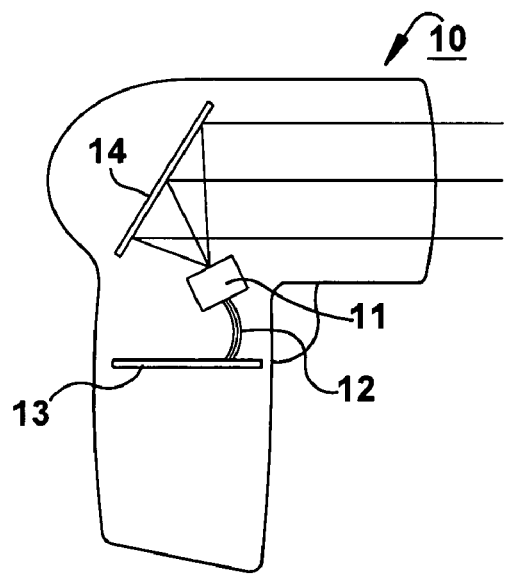
FIG. 1 is side view of a handheld imaging reader having a scan engine constructed in accordance with the prior art.

A side view of a portable hand-held imager 10 is depicted in FIG. 1 and includes a scan engine 11 as known in the prior art. Because of size constraints in the hand-held imager, the scan engine 11 is remotely connected via flex circuit 12 to printed circuit board 13, and requires a fold mirror 14 for receiving a reflected image from a target object.

Figure 2A:
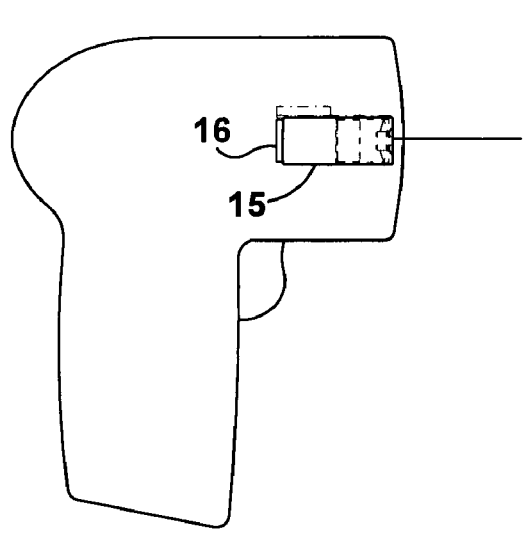
FIG. 2A is side view of a handheld imaging reader having a scan engine constructed in accordance with an exemplary embodiment of the present invention.
Figure 2B:
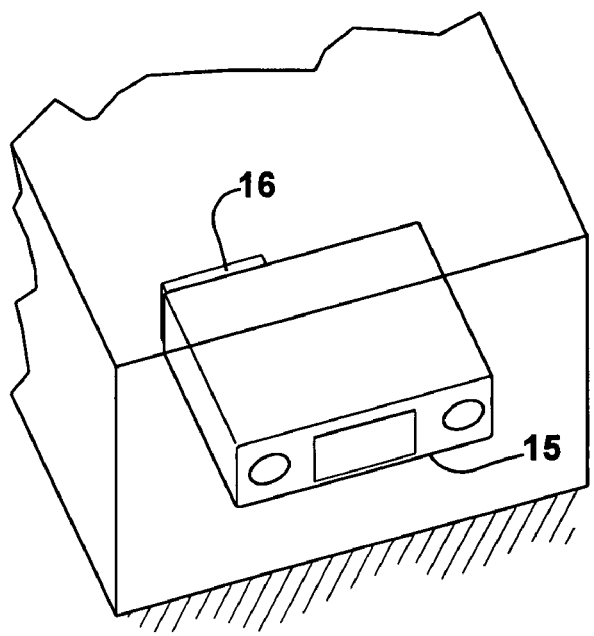
FIG. 2B is a stationary workstation employing a scan engine constructed in accordance with an exemplary embodiment of the present invention.
Figure 3:
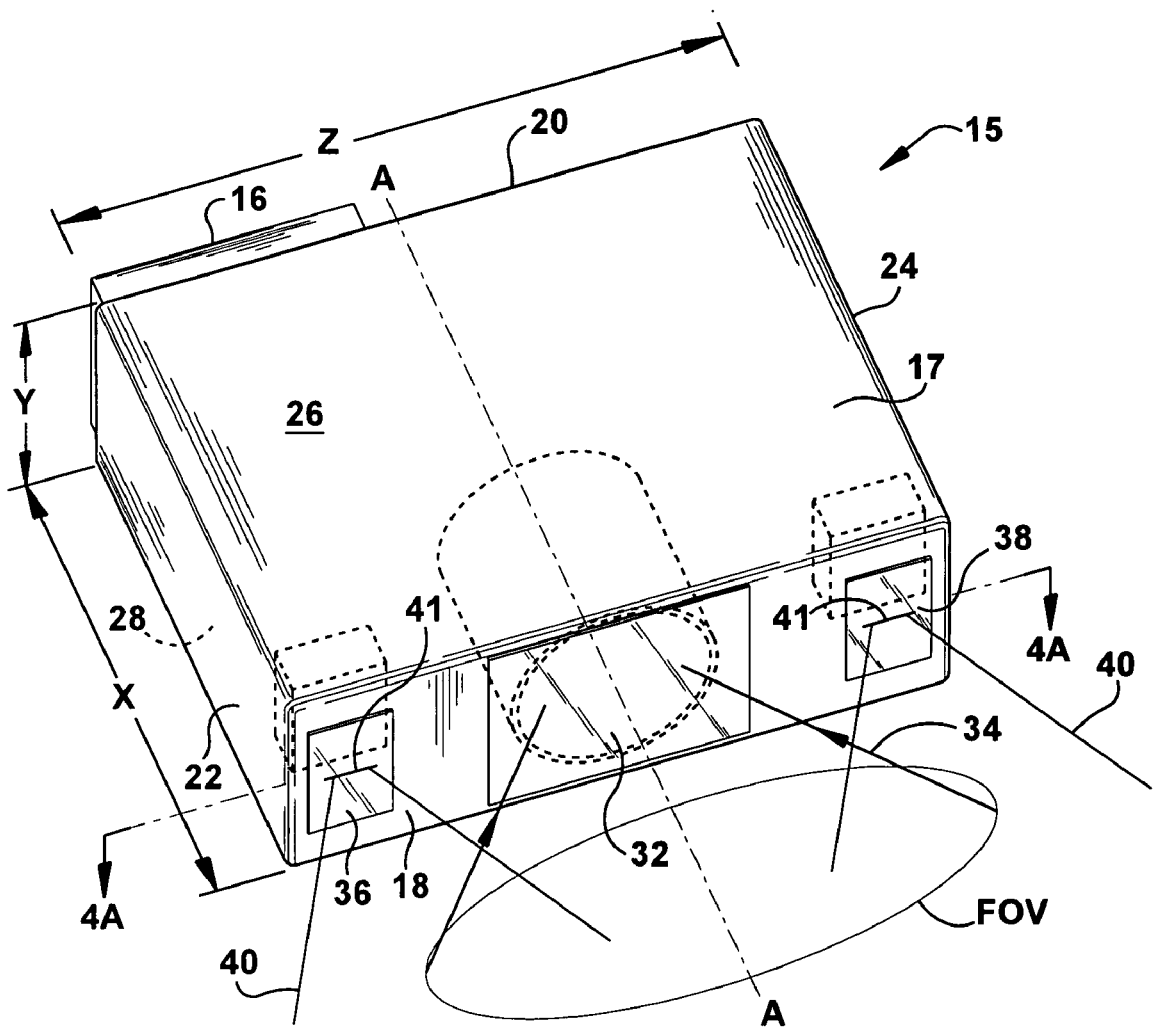
FIG. 3 is a perspective view of a scan engine constructed in accordance with an exemplary embodiment of the present invention.

FIG. 2A illustrates a portable hand-held imager having a compact scan engine 15 in accordance with one exemplary embodiment. FIG. 2B illustrates a stationary workstation with the scan engine 15 embedded into the scanner for use in retail purchasing scanning or manufacturing along a conveyor line. The scan engine 15 can be used in an unlimited number of applications that have a need for scanning or decoding graphic indicia into electrical signals intended to be descriptive of the article or some characteristic thereof. Such examples include handheld computers, imagers, medical instruments, diagnostic equipment, lottery terminals, robotics, cell phones, and the like. Contributing to its compact design, the scan engine 15 includes an integral printed circuit board (PCB) 16. FIG. 3 is a perspective view of the scan engine 15 in accordance with one exemplary embodiment. The scan engine comprises a housing 17, having a generally rectangular shape, but could comprise any geometrical configuration without departing from the spirit and scope of the claimed invention.

The housing 17 includes front 18 and rear 20 panels and first and second sides 22, 24, respectively. Connecting the sides 22, 24 and front and rear panels 18, 20 is a top cover 26 and a bottom cover 28. The PCB 16 is located about the rear panel 20 of the housing 17. The scan engine's compact design provides dimensions of about 14 mm×8 mm×20 mm corresponding to reference characters x, y, and z respectively as illustrated in FIG. 3. Positioned in the front panel 18 is a window 32 for receiving reflected light 34 of a target object such as a barcode. The reflected light 34 is received through the window 32 about an optical axis A-A. First and second lenses 36 and 38 focus or redirect light beams 40 from illumination sources to the imaging field of view (FOV). The lenses 36, 38 could be transparent or translucent material and include horizontal apertures 41 located in the lenses 36 and 38 for concentrating and redirecting the light beams 40, resulting in narrow lines of light directed at an imaging sensor FOV. The lenses 36 and 38 are movable in a vertical direction allowing for further alignment of the line of light projected therefrom. The positions of the lenses 36 and 38 determined during the assembly process and secured by an adhesive when proper positioning is achieved.

Figure 4A:
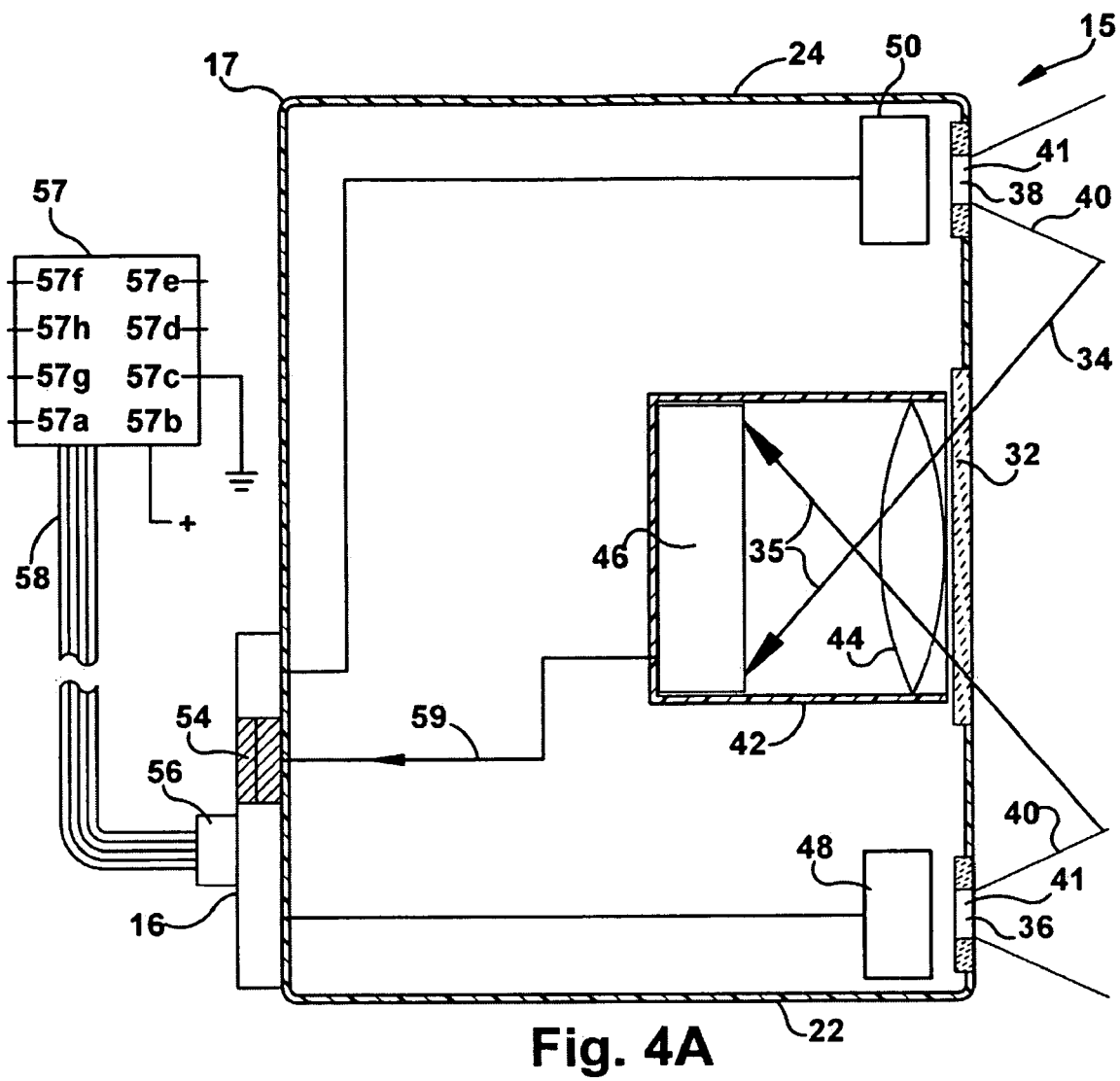
FIG. 4A is sectional plan view of the scan engine of FIG. 3 along section lines 4A-4A.

Referring now to FIG. 4A is a sectional plan view of the scan engine 15 along section line 4A-4A of FIG. 3 that reveals internal components of the scan engine 15 that are enclosed by a casing 42. The reflected light 34 is shown entering the window 32 and being focused by a focusing lens 44. An exposure controlled and focused reflected image 35 exits the focusing lens 44 and is received by a sensor 46. In the illustrated embodiment, the sensor 46 is a linear sensor that can be for example, a CMOS sensor with 1024 elements such as an ELIS 1024 CSP, manufactured by Panavision, or a linear CCD sensor.

Connected to the PCB 16 and located within the housing 17 are first and second illumination sources 48 and 50, respectively. The illumination sources 48, 50 can be individual light emitting diodes (LEDs) or a bank of LEDs. The light beams 38 are projected from the illumination sources 48, 50 through the lenses 38 toward a target object. The sensor 46 includes a field-of-view (FOV) (shown in FIG. 3) that illustrates the working range of the sensor 46 for receiving the reflected image 35 with respect to the light beams 38.

In one exemplary embodiment, the scan engine 15 is integrally connected to a single PCB 16 that is attached to the sensor 46, illumination sources 48, 50, an amplifier 54, and an interface 56. The integral connection with the PCB 16 is achieved by employing surface mount technology (SMT). The interface 56 provides a link between scan engine 15 and a remotely located host 57.

In one example embodiment, operation of the illumination sources 48, 50 are enabled by the remotely located host 57 via a ribbon cable 58 or other known communication interfaces by those skilled in the art. The remotely located host 57 is a programmable microprocessor but could be a programmable microcontroller or application specific integrated circuit (ASIC) without departing from the spirit or scope of the claimed invention. The host 57 includes a clock 57a providing a clock signal; a power source 57b; a ground 57c; and has at least one input 57d for receiving an output signal 59 from the linear sensor 46 of the scan engine 15. The remotely located host 57 also includes a reset 57e that provides a reset signal and exposure control signal output 57f via interface 56.

During operation, the remotely located host 57 provides power to the scan engine from the power source 57b that enables illumination sources 48 and 50 for projecting illumination patterns 40 that are altered to concentrated light patterns after passing through the lenses 36 and 38. The concentrated light patterns are projected upon a target object, such as a barcode and light is reflected from the target object surface toward the window 32 of the scan engine 15. The reflected light 34 is then focused by the focusing lens 44 upon the linear sensor 46. A plurality of pixels in a linear array is positioned within the linear sensor 46 that receives the reflected image 35. The linear sensor 46 then produces pixel values representing reflected image 35 that is converted into the analog signal 59, which is buffered and amplified by the amplifier 54. The amplified single 59 is transmitted from the scan engine 15 to the remotely located host 57 where the signal is converted to a digital signal by an analog-to-digital (A/D) converter 57g and decoded by a decoder 57h. The decoded signal is then synthesized by the decoder's internal circuitry for identifying the target object, such as a barcode and is transmitted an output 57j to a peripheral (not shown) such as a terminal, printer, liquid crystal display and the like typically for notifying the user.

The host 57 executes computer readable media such as software or firmware to process and decode analog signal 59 relating to the reflected image 35 from the target object at which the scan engine 15 was aimed. The firmware or software will also control exposure time by measuring the amplitude of the analog signal 59 and adjusting the exposure time on a subsequent scan if the analog signal 59 is too high or too low. The firmware or software is embedded within the host 57 microprocessor onto, for example, flash Read Only Memory (ROMs) or as a binary image file that can be programmed and downloaded to the microprocessor by a user.

Figure 4B:
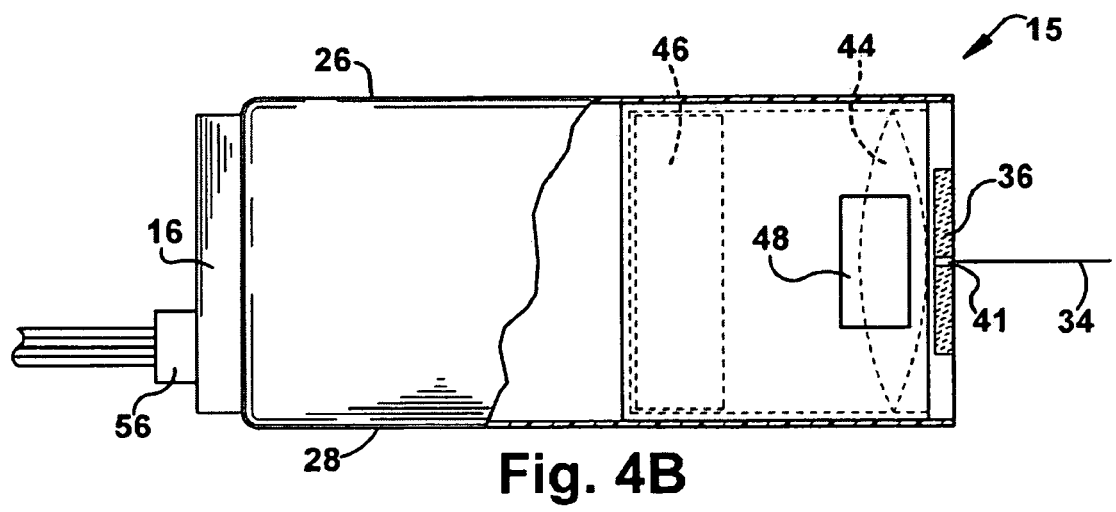
FIG. 4B is a partial sectional elevated side view of the scan engine of FIGS. 3 and 4A.
Figure 5A:
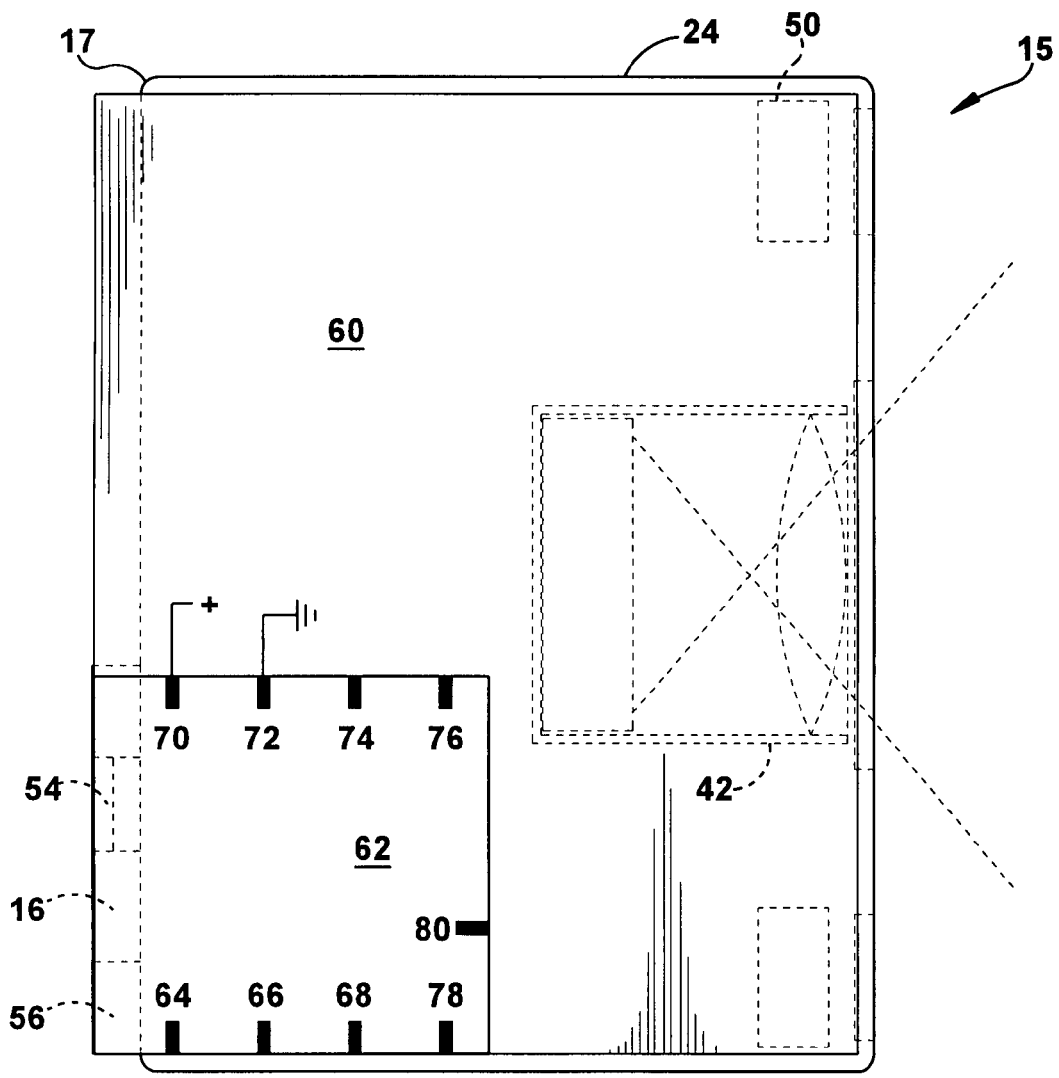
FIG. 5A is a plan view of another exemplary embodiment of a scan engine constructed in accordance with the present invention.
Figure 5B:
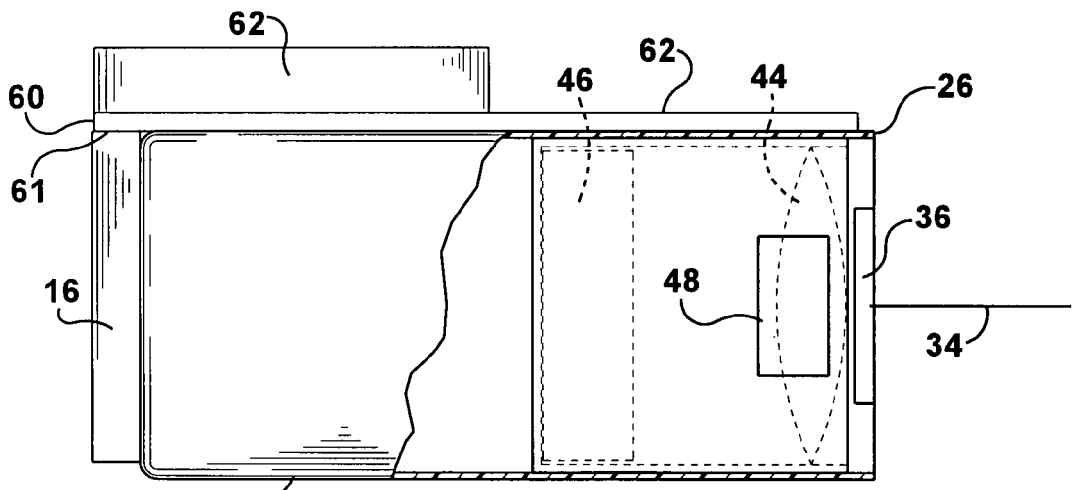
FIG. 5B is a partial sectional elevated side view of the scan engine of FIG. 5A.

In a separate exemplary embodiment the scan engine 15 includes a second printed circuit board 60 mounted to the top cover 28 as illustrated in FIGS. 5A and 5B. The second PCB 60 eliminates the need of a remotely located host 57 for decoding the analog signal 59 by achieving the previously described operations through the circuitry connected to the second PCB, while maintaining the scan engine's 15 compact design. The interface 56 remains for transmitting decoded information to a peripheral host, such as a cash register. The second PCB 60 is butt soldered together with PCB 16 as best seen in FIG. 4B, providing a communication connection 61 between the two boards. Located on top and forming a communication connection with the second PCB 60 is a microprocessor 62, which could alternatively be a microcontroller or ASIC without departing from the spirit and scope of the claimed invention. The addition of the second PCB 60 and the microprocessor 62 increase the height about 3 mm with respect to the Y coordinate of FIG. 3 in the overall size of the scan engine 15.

The microcontroller includes an A/D converter 64 for converting the amplified analog signal 59 from the linear sensor 46 to a digital signal that is decoded by a decoder 66 creating a decoded signal that is synthesized by the decoder's internal circuitry for identifying the target object. The decoded signal is transmitted by an output 80 to a peripheral (not shown) such as a terminal, printer, liquid crystal display and the like, typically for notifying the user.

The microprocessor 62 includes a clock 68 for providing clock signal to the PCB 16, a power source 70, and a ground 72 to the scan engine 15. The power source 70 could be supplied from an external source typically requiring a voltage regulator (not shown) or could be a battery attached to the scan engine 15 (not shown). The microprocessor 62 further includes an input 74 for receiving the amplified signal 59 from the linear sensor 46 sent through the amplifier 54 via the butt soldered communication connection 61 between PCB 16 and PCB 60.

The microprocessor 62 also includes a reset 76 that provides a reset signal, exposure control signal output 78 for controlling the exposure time base on prior amplified signals 59, and an output 80 for controlling different components within the scan engine 15, for example enabling the first and second illumination sources 48, 50.

During operation, the microprocessor 62 provides power to the scan engine 15 from the power source 70 that in combination with the output 80 enables illumination sources 48 and 50 for projecting illumination patterns 40 that are altered to concentrated light patterns after passing through the lenses 36 and 38. The concentrated light patterns are projected upon a target object, such as a barcode and light is reflected from the target object surface toward the window 32 of the scan engine 15. The reflected light 34 is then focused by the focusing lens 44 upon the linear sensor 46 creating a reflected image 35. A plurality of pixels in a linear array is positioned within the linear sensor 46 that receives the reflected image 35. The linear sensor 46 then produces pixel values representing reflected image 35 that is converted into the analog signal 59, which is buffered and amplified by the amplifier 54. The amplified single 59 is transmitted from an output on the PCB 16 to the PCB 60 through the communication connection 61 into the input 74 of the microprocessor 62. The microprocessor's converts the amplified signal 59 to a digital signal by the A/D converter 64 which is then decoded by the decoder 66. The decoded signal is then synthesized by the decoder's internal circuitry for identifying the target object and transmitted from the output 80 to a peripheral (not shown) such as a terminal, printer, liquid crystal display and the like, typically for notifying the user.

The microprocessor 62 executes computer readable media such as software or firmware to process and decode analog signal 59 relating to the reflected image 35 from the target object at which the scan engine 15 was aimed. The firmware or software within the microprocessor 62 will also control exposure time by measuring the amplitude of the analog signal 59 and adjusting the exposure time on a subsequent scan if the analog signal 59 is too high or too low. The firmware or software is embedded within the microprocessor 62 onto, for example, flash Read Only Memory (ROMs) or as a binary image file that can be programmed and downloaded to the microprocessor by a user.

It can be seen from the foregoing description that scan engine having an integral PCB or two PCBs coupled to the illumination sources and linear sensor provide a compact structure through the describe configuration. While the positioning of the PCB 16 and PCB 60 have been described with a certain degree of particularity, the PCB could be positioned elsewhere on the scan engine 15, such as connecting PCB 60 to the bottom cover 28, alternatively the PCBs 16, 60 could replace and act as any one of the sides 22, 24, panels 18, 20, or covers 26, 28. Such improvements, changes in positioning, and modifications within the skill of the art are intended to be covered by the appended claims. Further, the invention as a whole has been described with a certain degree of particularity, it should be understood that various changes can be made by those skilled in the art without departing from the scope of the invention hereinafter claimed.

We claim:

1. A scan engine comprising:
at least one illumination source for projecting a light beam upon a target object;
a focusing lens that receives reflected light from the target object and focuses the reflected light as it passes through said focusing lens along an optical axis;
a linear sensor receives a reflected image directly from said focusing lens, providing a signal representing the reflected image;
a circuit board integrally connected to said at least one illumination source and said linear sensor;

a second circuit board having an integral connection with said first circuit board that allows for communication therebetween;

a microprocessor integrally connected to said second circuit board having a decoder for decoding said signal; and an amplifier connected to said first circuit board for amplifying the signal to said decoder.

2. A scan engine comprising:

at least one illumination source for projecting a light beam upon a target object;

a focusing lens that receives reflected light from the target object and focuses the reflected light as it passes through said focusing lens along an optical axis;

a linear sensor receives a reflected image directly from said focusing lens, providing a signal representing the reflected image;

a first circuit board integrally connected to said at least one illumination source and said linear sensor, said first circuit board is substantially perpendicular to said optical axis;

a second circuit board having an integral connection with said first circuit board that allows for communication therebetween, the second circuit board being transversely positioned about said first circuit board; and a housing having a plurality of surfaces for enclosing said a least one illumination source, said focusing lens, and linear sensor, said first circuit board providing one of said surfaces of said housing.

3. A scan engine comprising:

at least one illumination source for projecting a light beam upon a target object;

a focusing lens that receives reflected light from the target object and focuses the reflected light as it passes through said focusing lens along an optical axis;

a linear sensor receives a reflected image directly from said focusing lens, providing a signal representing the reflected image;

a first circuit board integrally connected to said at least one illumination source and said linear sensor, said first circuit board is substantially perpendicular to said optical axis;

a second circuit board having an integral connection with said first circuit board that allows for communication therebetween, the second circuit board being transversely positioned about said first circuit board; and a housing having a plurality of surfaces for enclosing said at least one illumination source, said focusing lens, and linear sensor, said second circuit board providing one of said surfaces of said housing.

4. A method of processing indicia with a scan engine, the method comprising the steps of:

projecting a light beam upon a target object from at least one illumination source;

focusing reflected light from the target object through a focusing lens onto a linear sensor;

generating a signal from the linear sensor corresponding to the reflected image;

transmitting said signal to an output; and forming a communication connection between the at least one illumination source and said linear sensor and a first printed circuit board by integrally connecting the at least one illumination source and said linear sensor to the printed circuit board;

forming a communication connection by integrally connecting a second printed circuit board with said first printed circuit board that allows for communication therebetween; and enabling said at least one illumination source by said by a signal generated by said second circuit board and concentrating said light beam by providing a housing having at least one lens positioned relative to said at least one illumination source such that the light beam is projected through said at least one lens having a horizontal aperture located within said lens for producing a concentrated light beam.

5. A scan engine for decoding indicia descriptive of an article having a linear sensor that receives a reflected image relating to the indicia, the scan engine comprising:

a housing providing a container for said scan engine, the housing having a plurality of surfaces;

a plurality of illumination sources located within said housing for projecting light beams upon the indicia;

a plurality of illumination lenses movably connected to said housing and corresponding to said plurality of illumination sources, each of the illumination lenses having a horizontal slit aperture located within said lenses, allowing each of said illumination sources to project a light beam through a corresponding illumination lenses such that the illumination lenses form a narrow line of light from each respective light beam;

an imaging lens for focusing a reflected image of the target object directly onto said linear sensor about an optical axis, the linear sensor providing an analog signal representing the reflected image relating to the indicia; and a circuit board integrally connected to said plurality of illuminations sources, and said linear sensor allowing for communication therebetween, said circuit board being transversely mounted relative to said optical axis and fixedly attached to said housing.

6. The scan engine of claim 5 further comprising a second circuit board having an integral connection with said first circuit board that allows for communication therebetween, said second circuit board transversely positioned relative to said first circuit board.

7. The scan engine of claim 6 wherein said first circuit board or said second circuit board replace any one of said plurality of surfaces of said housing.

8. The scan engine of claim 5 wherein said analog signal is transmitted to a remote host for decoding, said remote host for decoding the analog signal.

9. A scan engine comprising:

at least one illumination source for projecting a light beam upon a target object;

a focusing lens that receives reflected light from the target object and focuses the reflected light as it passes through said focusing lens along an optical axis;

a linear sensor receives a reflected image directly from said focusing lens, providing a signal representing the reflected image;

a circuit board integrally connected to said at least one illumination source and said linear sensor;

a housing having at least one lens positioned relative to said at least one illumination source such that the light beam is projected through said at least one lens having a horizontal slit aperture located within said lens for concentrating the light beam;

wherein said at least one lens having a horizontal aperture located within said lens is movably connected to said housing for directing the concentrated light beam.

* * * * *